United States Patent [19]

Komura et al.

[11] E Re. 30,162

[45] Reissued Dec. 11, 1979

[54] METHOD AND DEVICE FOR TRANSFERRING FRESH BOBBINS FROM A BOBBIN SUPPLY DEVICE TO A CONVEYOR BELT OF A TEXTILE MACHINE

[75] Inventors: Ikuo Komura, Toyota; Hideo Tamai, Kariya; Takayuki Morita, Obu; Masanao Kobayakawa, Anjyo, all of Japan

[73] Assignee: Kabushiki Kaisha Toyoda Jidoshokki Seisakusho, Aichi, Japan

[21] Appl. No.: 785,187

[22] Filed: Apr. 6, 1977

Related U.S. Patent Documents

Reissue of:

[64] Patent No.: 3,938,308
Issued: Feb. 17, 1976
Appl. No.: 534,723
Filed: Dec. 20, 1974

[30] Foreign Application Priority Data

Dec. 26, 1973 [JP] Japan ..... 49-2498[U]

[51] Int. Cl.[2] ..... D01H 9/18

[52] U.S. Cl. ..... 57/266; 57/281; 414/414

[58] Field of Search ..... 57/34 R, 52, 53, 54, 57/156; 221/13, 263; 242/41; 193/44, 45; 198/651

[56] References Cited

U.S. PATENT DOCUMENTS

| | | | |
|---|---|---|---|
| 2,886,940 | 5/1959 | Urano et al. | 57/54 X |
| 3,024,887 | 3/1962 | Ingham | 57/52 UX |
| 3,154,909 | 11/1964 | Urano et al. | 57/52 |
| 3,382,659 | 5/1968 | Schultz et al. | 57/54 |
| 3,410,452 | 11/1968 | Igel et al. | 221/13 |
| 3,531,016 | 9/1970 | Pray | 198/651 X |
| 3,603,440 | 9/1971 | Pray | 193/44 |
| 3,698,536 | 10/1972 | Pray et al. | 198/651 |
| 3,830,049 | 8/1974 | Kieronski et al. | 242/41 X |

*Primary Examiner*—Donald Watkins
*Attorney, Agent, or Firm*—Burgess, Ryan and Wayne

[57] ABSTRACT

In a textile machine provided with a doffing and donning apparatus utilizing a conveyor belt for temporarily supporting full size yarn packages doffed from the textile machine and carrying the yarn packages outside the textile machine and for temporarily supporting fresh bobbins supplied from a fresh bobbin supply device mounted on an outend frame of the textile machine, a method and device for transferring fresh bobbins from the bobbin supply device to the respective pegs of the conveyor belt when the conveyor belt is driven before starting the donning operation. When the conveyor belt is driven so as to pick up the fresh bobbins by the respective pegs, each peg is inserted into the bottom bore of the corresponding fresh bobbin in such a way that the head of the peg approaches the bottom bore of the fresh bobbin along a passage inclined to a plane along which the fresh bobbins are supported.

6 Claims, 13 Drawing Figures

METHOD AND DEVICE FOR TRANSFERRING FRESH BOBBINS FROM A BOBBIN SUPPLY DEVICE TO A CONVEYOR BELT OF A TEXTILE MACHINE

Matter enclosed in heavy brackets [ ] appears in the original patent but forms no part of this reissue specification; matter printed in italics indicates the additions made by reissue.

SUMMARY OF THE INVENTION

The present invention relates to a method and device for transferring fresh bobbins from a bobbin supply device mounted on an outend frame of a textile machine to a conveyer belt which is utilized for a doffing and donning apparatus mounted on the textile machine.

It is well known that, in the spinning operation, when each yarn package formed on a bobbin held by each spindle reaches a predetermined full size, the full packaged bobbins are doffed from the respective spindles and carried outside of the spinning or twisting machine and, then, fresh bobbins are mounted upon the respective empty spindles. To carry out the above-mentioned doffing and donning operation, several automatic apparatus have been introduced. One of them is disclosed in the U.S. Pat. No. 3,370,411 (Schulz et al).

In this type of doffing and donning apparatus the operation is carried out simultaneously upon all spindles of a spinning or twisting machine. That is, a full packaged bobbin is doffed from each of the spindles simultaneously by a mechanical gripping means and the doffed bobbins are transferred onto respective pegs arranged upon a conveyer belt in such a way that the distance between two adjacent pegs is identical to half the distance of the spindle pitch, and; then, the conveyer belt is driven so as to carry the full size yarn packages outside the spinning machine. Thereafter, the conveyer belt is driven toward an opposite direction to the above-mentioned driving of the conveyer belt. During the above-mentioned driving of the conveyer belts toward the opposite direction, fresh bobbins are supplied from a fresh bobbin supply device to the respective pegs of the conveyer belt. When a fresh bobbin is mounted on a peg of the conveyer belt, it is necessary that each peg be inserted into the bottom bore of the respective fresh bobbin in correct engaging condition. Therefore, a key point is how to supply fresh bobbins to the respective pegs of the conveyer belt in correct engaging condition, so that the fresh bobbin supply motion from the fresh bobbin supply device can be carried out with high efficiency. It is the principal object of the present invention to provide a method and device for transferring fresh bobbins from a bobbin supply device mounted on a textile machine provided with a doffing and donning apparatus to a conveyer belt for temporarily supporting the fresh bobbins before starting the donning operation.

A typical transferring device according to the present invention, comprises a bobbin supply casing disposed between the conveyer belt and a bobbin supply chute of a bobbin supply device and a regulating device disposed at a fresh bobbin discharging outlet of the bobbin supply casing. The bobbin supply casing is a casing which is capable of receiving fresh bobbins from the bobbin supply chute of the bobbin supply device and temporarily reserving a plurality of fresh bobbins therein. The bobbin supply casing is provided with a bottom guide plate inclined downward from a rear end to a forward end thereof, and an aperture facing the outlet of the bobbin supply chute and the fresh bobbin discharging outlet formed at a forward side thereof. The bottom guide plate is provided with a cut-out portion formed at a position below the discharging outlet and the area of this cut-out portion is smaller than the thickness of the bottom end of each bobbin, but larger than the thickness of each peg mounted on the conveyer belt. Consequently, each fresh bobbin is capable of being positioned on this cut-out portion and each peg is capable of approaching the bottom bore of a fresh bobbin positioned on this cut-out portion of the bottom guide plate through this cut-out portion. When the peg of the conveyer belt comes into the cut-out portion from the rear side of the bottom guide plate, the peg is slightly inserted into the bottom bore of the fresh bobbin and, therefore, the peg urges the inside wall of the fresh bobbin outside the casing due to the driving of the conveyer belt.

The regulating device prevents free passage of the fresh bobbins from the bobbin supply casing and also corrects the relative position of the fresh bobbin to the corresponding peg whereon the fresh bobbin should be mounted. The regulating device comprises: a bottom stopper disposed at a bottom position of the discharging outlet which restricts free discharge of the bottom portion of fresh bobbins when each fresh bobbin is transferred from the bobbin supply casing to the respective pegs of the conveyer belt, and; a resilient stopper plate turnably mounted to the bobbin supply casing at a top portion of the discharging outlet thereof in such a condition that, when a fresh bobbin is mounted on a peg in an incorrect engaging condition, the head of the fresh bobbin contacts the stopper plate due to the displacement of the pegs of the conveyer belt along the spindle rail of the textile machine. Since the stopper plate is a resilient body, the above-mentioned fresh bobbin is capable of passing below the stopper plate without injuring itself, the peg or the conveyer belt. [In a modification of the above-mentioned regulating device, a stationary member may be utilized instead of the above-mentioned resilient stopper plate.]

BRIEF EXPLANATION OF THE DRAWINGS

[FIG. 10 is a schematic side view of a modified transferring apparatus according to the present invention.]

DETAILED EXPLANATION OF THE INVENTION

Figure 1:
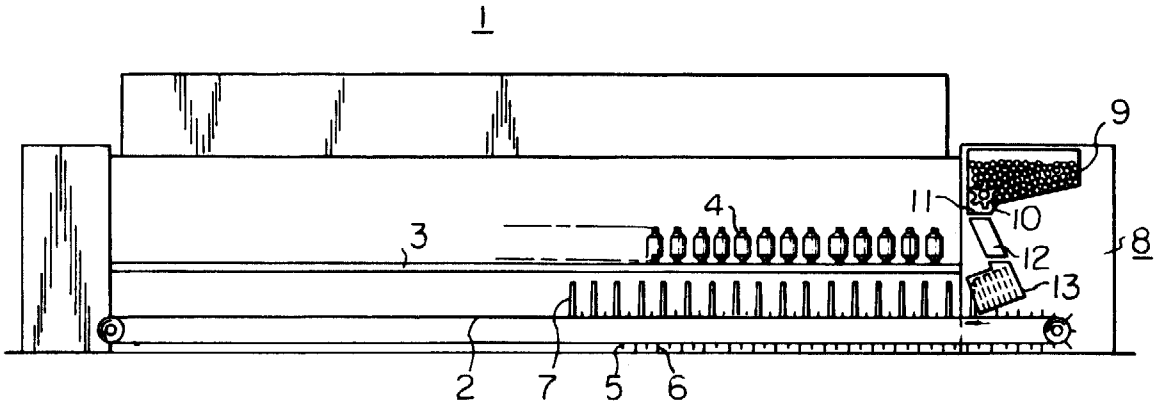
FIG. 1 is a schematic front view of a textile machine provided with the above-mentioned doffing and donning apparatus and a bobbin supply device wherein the transferring device of the present invention is utilized.
Figures 2A, 2B:
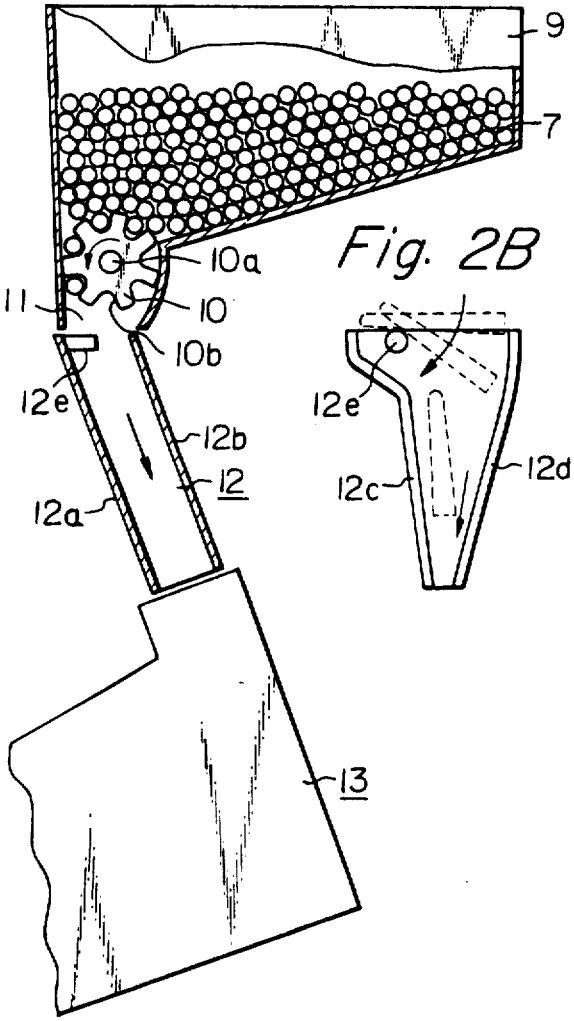
FIG. 2A is a schematic front view, partly omitted, of the bobbin supply device shown in FIG. 1.
FIG. 2B is a schematic inside view of a chute of the bobbin supply device shown in FIG. 2A.

For the sake of a better understanding of the present invention, a textile machine provided with a bobbin supply device utilizing the fresh bobbin transferring device of the present invention is explained. Referring to FIGS. 1, 2A and 2B, a textile machine 1 is provided with a doffing and donning apparatus (not shown) provided with a conveyer belt 2 disposed at a lower front position thereof in parallel condition to a spindle rail (not shown) thereof and a horizontal stand 3 disposed above the conveyer belt 2 in parallel condition to the conveyer belt 2. The horizontal stand 3 is provided with a plurality of pegs (not shown), arranged with an intervening distance between two adjacent pegs which is identical to the spindle pitch of the textile machine 1, so as to temporarily support full size yarn packages 4. The conveyer belt 2 is provided with a plurality of first pegs 5, arranged with an intervening distance between two adjacent first pegs 5 which is identical to the spindle pitch of the textile machine 1, and a plurality of second pegs 6 mounted thereon in such a way that each second peg 6 is disposed at just a middle position between two adjacent first pegs 5. The first pegs 5 are respectively utilized for holding full yarn packages 4 while the second pegs 6 are respectively utilized for holding fresh bobbins 7. Since the doffing and donning operation of the above-mentioned textile machine is well known as disclosed in several patent specifications such as U.S. Pat. No. 3,370,411, the explanation concerning the operation of the conveyer belt 2 is omitted.

At an outend-frame of the textile machine, there is provided a bobbin supply device 8 which comprises a fresh bobbin reserve box 9 provided with a bobbin feeding member 10 turnably disposed at a position adjacently above a discharging aperture 11 thereof, and a chute 12 disposed right below the discharging aperture 11. A fresh bobbin transferring device 13 is disposed at a position between the chute 12 of the bobbin supply device 8 and an end portion of the conveyer belt 2. The bobbin feeding member 10 is rigidly mounted on a horizontal shaft 10a turnably supported by a pair of bearings secured to side frames (not shown) of the fresh bobbin reserve box 9 at a position adjacently above the discharging aperture 11 thereof, and the horizontal shaft 10a is turned by a driving mechanism (not shown) driven by a power transmission mechanism (not shown) connected to a driving mechanism of the conveyer belt 2 when the donning operation is carried out. The bobbin feeding member 10 is provided with a plurality of horizontal grooves 10b, each groove permitting acceptance of a fresh bobbin 7 thereon. The bobbin reserve box 9 is provided with a sufficient capacity for reserving numerous fresh bobbins therein. However, when such fresh bobbins 7 are fed into reserve box 9, it is necessary to put these fresh bobbins 7 in such a condition that a head portion of each fresh bobbins 7 faces one side-frame of the reserve box 9. The chute 12 comprises a pair of parallel guide walls 12a and 12b which are formed in inclined condition as shown in FIG. 2A, and another pair of guide walls 12c and 12d by which both side openings between the guide walls 12a and 12b are closed. The intervening space between these guide walls 12c and 12d is gradually decreased from the top to the bottom as shown in FIG. 2B. A horizontal projection 12e is projected from a top end portion of the guide wall 12a. Consequently, when a fresh bobbin 7 is dropped from the bobbin feeding member 10, an end portion of the dropping fresh bobbin 7 contacts the projection 12e, and the bobbin 7 is subjected to turn in the clockwise direction as shown in FIG. 2B and, then, discharged from the chute 12 with the other end portion of the first bobbin 7. When a fresh bobbin 7 is supplied into the auxiliary device 13 from the bobbin supply device 8, it is necessary to supply the fresh bobbin 7 in a substantially upright or slightly inclined condition, that is, the bobbin 7 must be supplied into the auxiliary device 13 with the bottom end thereof going in first. Therefore, in this embodiment, when the fresh bobbins 7 are put into the reserve box 9 of the bobbin supply device 8, it is necessary to face the head of each bobbin 7 toward the side wall which is on the same side as the guide wall 12c.

Figure 3:
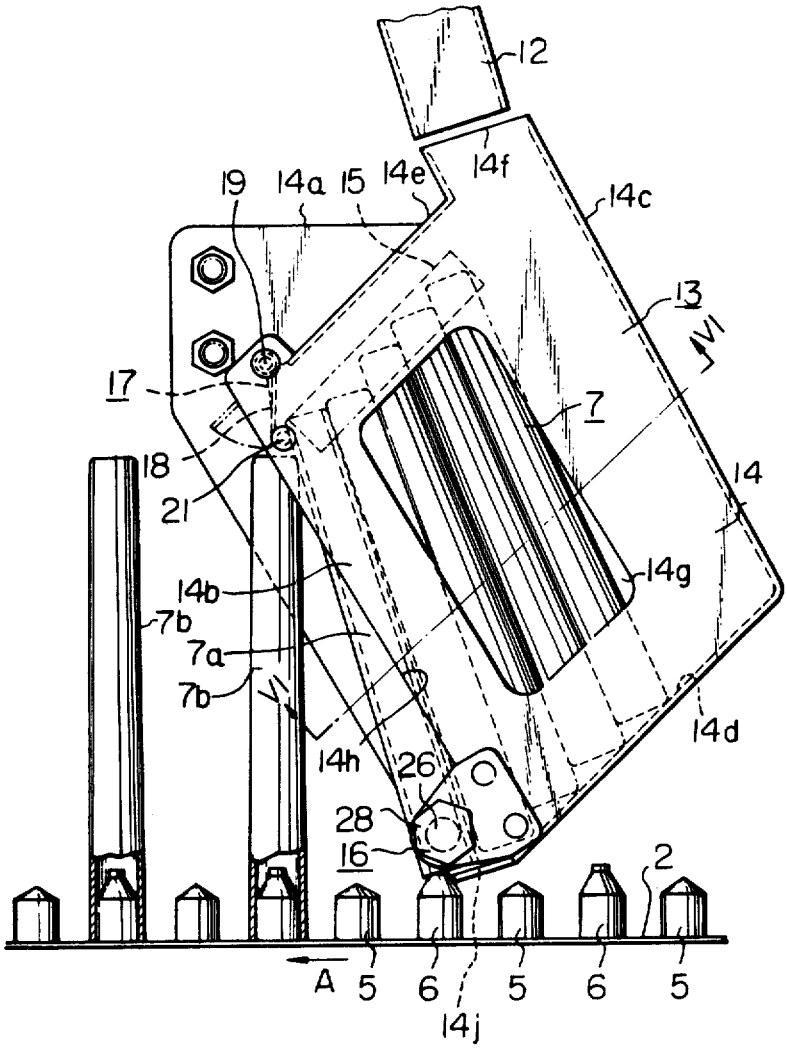
FIG. 3 is a schematic side view of the transferring device provided with the regulating device according to the present invention.
Figure 4:
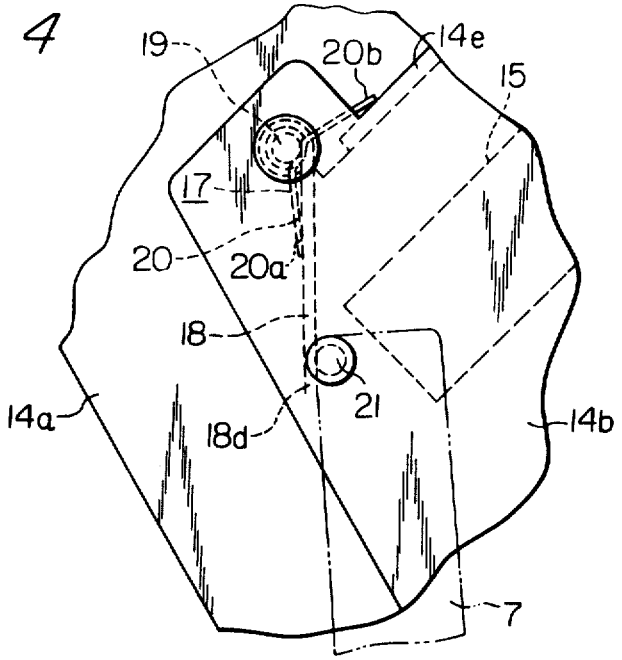
FIG. 4 is an enlarged side view of a front top portion of the transferring device shown in FIG. 3.
Figure 5:
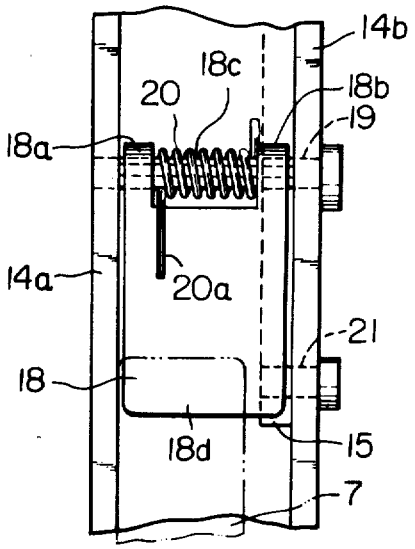
FIG. 5 is a schematic front view of the part of the transferring device shown in FIG. 4.
Figure 6:
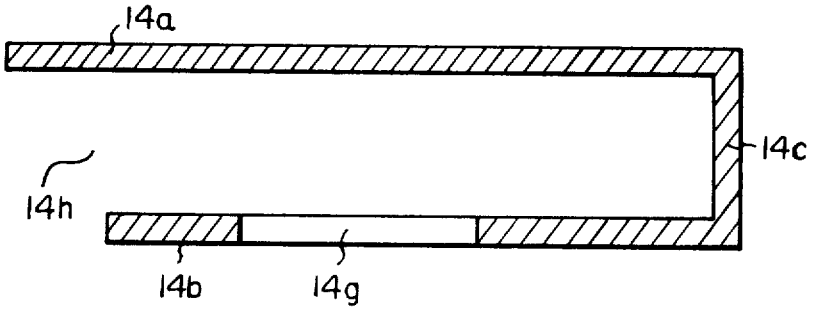
FIG. 6 is a cross-sectional view of a bobbin supply casing of the transferring device, taken along a line VI—VI in FIG. 3.

Referring to FIGS. 3 through 6, the fresh bobbin transferring device 13 comprises a casing 14 and a regulating device disposed at a discharging outlet of the casing 14. The casing 14 is formed by a pair of parallel guide walls 14a and 14b; a rear-side wall 14c, which closes a rear side of the casing 14; a bottom guide wall 14d, which closes a bottom side of the casing 14 in such a condition that the guide wall 14d is inclined downward from the rear side to the front side of the casing 14 so that fresh bobbins 7 can be slid forward, and; a top cover 14e, which closes a part of the top side of the casing 14 so as to provide an inlet aperture 14f at a position facing the discharge aperture of the chute 12. The guide wall 14a is secured to the frame of the bobbin supply device 8. The casing 14 is provided with a guide rail 15 secured to the guide wall 14b so as to form a guide passage for the top end portion of each fresh bobbin 7, and also provided with side aperture 14g formed in the guide wall 14b at a position below the guide rail 15. Consequently, it is possible to inspect the condition inside the casing 14. The regulating device comprises a bottom stopper 16 disposed at a bottom portion of a discharging outlet 14h of the casing 14 and a resilient stopper 17 disposed at a top portion of the discharging outlet 14h. The resilient stopper 17 comprises a stopper plate 18 turnably mounted on a supporting pin 19 secured to the guide walls 14a and 14b and a helical spring 20 mounted on the supporting pin 19 at a space 18c between a pair of shoulders 18a, 18b in such a way that an end portion 20a of the spring 20 urges the stopper plate 18 while the other end of the spring 20 urges the top cover 14e of the casing 14. A stop pin 21 is mounted on the side wall 14b so as to restrict the turning motion of the stopper plate 18 about the supporting pin 19. The stopper plate 18 is extended beyond a passage of the top of the head of the fresh cop 7 as shown in FIG. 4.

Figure 7:
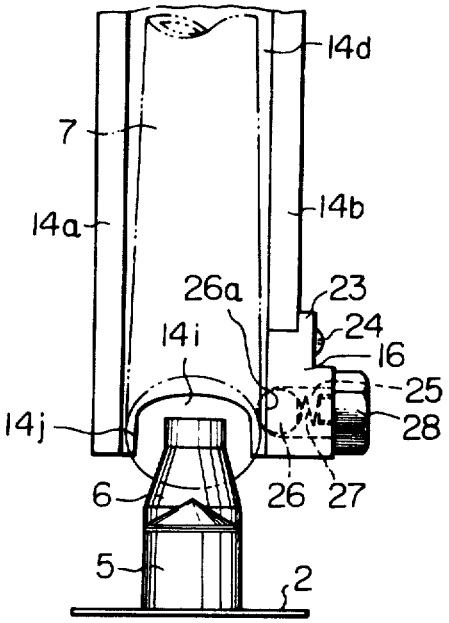
FIG. 7 is an explanatory front view of a front bottom portion of the transferring device shown in FIG. 3.

Referring to FIG. 7, the bottom guide wall 14d is provided with a cut-out portion 14i formed at a leading end portion thereof, and the bottom stopper 16 comprises a bracket 23 secured to the side wall 14b by a fastening screw 24. The bracket 23 is provided with an aperture 25 for incasing a ball 26 therein. The aperture 25 is provided with an inside circular opening 26a which prevents free passing of the ball 26 therethrough. That is, the diameter of the opening 26a is smaller than the diameter of the ball 26. The other opening of the aperture 25 is thread engaged with a bolt 28, and an expansion spring 27 is disposed in the aperture 25 at a position between the ball 26 and the bolt 28 so that the ball is always urged to the inside opening 26a. Consequently, a part of the ball 26 is resiliently projected inward from the inside opening 26a. The intervening space between the guide walls 14a and 14b is only slightly larger than the outside diameter of the bottom end portion of a fresh bobbin 7 and, therefore, the free passage of the bottom portion of the fresh bobbin 7 through the bottom portion of the casing 14 is prevented by the bottom stopper 16. However, if the bottom portion of the fresh bobbin 17 is urged toward the outside of the casing 14, the ball 26 is displaced into the aperture 25 in a condition of compressing the expansion spring 27, and the bottom portion of the fresh bobbin 17 is then capable of leaving the casing 14. The above-mentioned urging of the bottom portion of the fresh bobbin 7 is created by the relative displacement of the peg 6 toward a direction represented by an arrow A in FIG. 3. That is, an inclined free end portion 14j of the bottom guide wall 14d is extended to a position at a level which is a little lower than the passage of the head of the pegs 6. The cut-out portion 14i is formed at this free end portion 14j in such a way that the head of each peg 6 is capable of passing through this cut-out portion 14i as shown in FIG. 7. The inclination of the free end portion 14j is formed in such a condition that the head of the peg 6 is capable of inserting itself into a bottom bore of the fresh bobbin 7 and urging an inside wall of the fresh bobbin 7 toward a direction represented by the above-mentioned arrow A.

Next, the function of the regulating device according to the present invention is hereinafter explained in detail. Referring to FIGS. 1, 2A, 3, 8, 9A, 9B, 9C and 9D, when it is required to supply fresh bobbins 7 to the conveyer belt 2 from the bobbin supply device 8 by way of the auxiliary device 13, the bobbin feeding member 10 is rotated counterclockwise (in FIG. 2A) so that the fresh bobbins 7 are dropped into the chute 12 one by one. Each fresh bobbin 7 dropped from the bobbin feeding member 10 is dropped into the chute 12 in such a condition that the fresh bobbin 7 falls down from the bottom end thereof by the action of the horizontal projection 12e. Consequently, a plurality of fresh bobbins 7 are placed into the casing 14 of the auxiliary device 13 in the condition shown in FIG. 3. Since the bottom guide wall 14d is inclined downward from the rear side wall 14c toward the discharging opening 14h, these bobbins 7 are capable of displacing toward the discharging outlet 14h of the casing 14 each time a fresh bobbin 7a is discharged from the discharging outlet 14h. A fresh bobbin 7a displaced to the discharging outlet 14h is supported by a free end portion 18d of the stopper plate 18 and the ball 26 as shown in FIG. 3. When the conveyer belt 2 is driven so as to displace the pegs 5 and 6 toward the direction represented by the arrow A in FIG. 3, since each peg 5 for receiving a full size yarn package 4 does not reach the inclined free end portion 14j of the case 14, each peg 5 passes under the free end portion 14j. However, when each peg 6 passes through the cut-out portion 14i of the end portion 14j of the casing 14, the peg 6 is inserted into the bottom bore of the fresh bobbin 7a positioned at the discharging outlet 14h of the casing 14, and then pushes the inside wall of the above-mentioned bottom bore of the fresh bobbin 7a toward the direction represented by the arrow A shown in FIG. 3. According to the above-mentioned urging motion by the peg 6, the bottom end portion of the fresh bobbin 7a urges the ball 26 inside the aperture 25 so that the bottom end portion of the fresh bobbin 7a is discharged from the bottom portion of the outlet 14h of the casing 14. During the above-mentioned condition, the forward displacement of the head portion of the fresh bobbin 7a is stopped by the stopper plate 18 as shown in FIGS. 3, 9A and 9B. Thereafter, the fresh bobbin 7a is perfectly mounted on the peg 6 in upright condition by its own weight. When the fresh bobbin 7a is perfectly mounted on the peg 6, the fresh bobbin 7a is displaced in the downward direction represented by an arrow B as shown in FIG. 9C, and finally the head of the fresh bobbin 7a is positioned at a position below the stopper plate 18 as shown in FIG. 9D. Consequently, this fresh bobbin 7a is capable of passing below the stopper plate 18. In this condition, the next fresh bobbin 7C is displaced toward the discharging outlet 14h as shown in FIG. 9D. According to the motion of the conveyer belt 2, the peg 6 holding the fresh bobbin 7a is displaced toward the direction represented by the arrow A. Such fresh bobbins are represented by 7b in the above-mentioned drawings.

Figure 8:
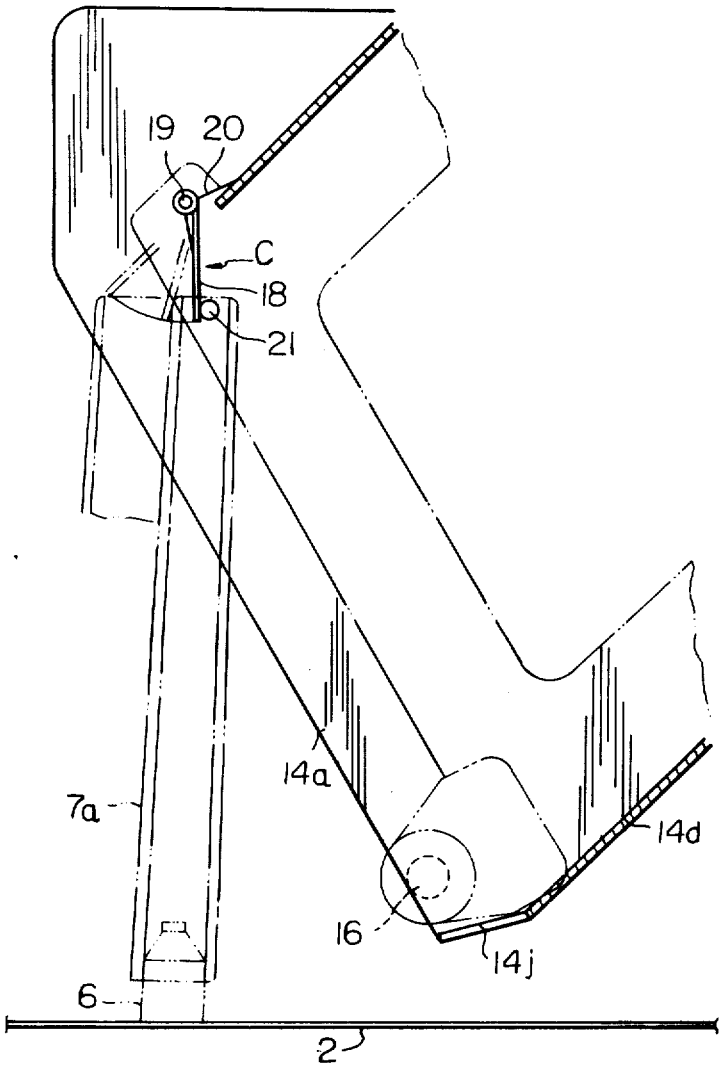
FIG. 8 is an explanatory side view of a discharging outlet of the transferring device shown in FIG. 3.
Figure 9A:
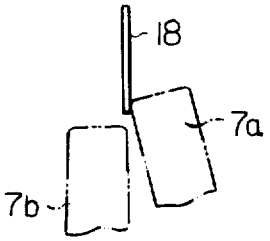
FIGS. 9A, 9B, 9C and 9D are schematic side views of a part of the stopper plate of the transferring device in stepwise relation with fresh bobbins, according to the displacement of pegs secures to a conveyer belt.
Figure 9B:
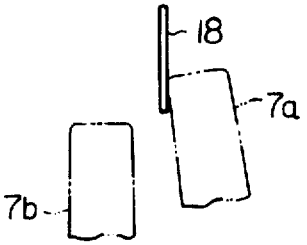
Figure 9C:
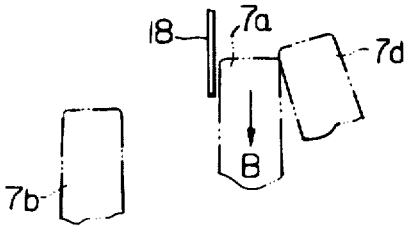
Figure 9D:
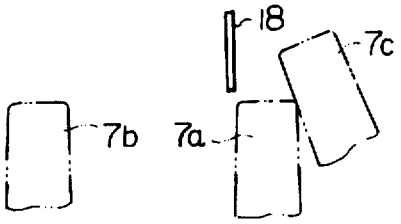

However, if the fresh bobbin 7a is not mounted on the peg 6 in the correct condition, which is described above, that is, if the fresh bobbin 7a rests on the peg 6 in a slightly inclined condition as shown in FIG. 8, the fresh bobbin 7a is held by the peg 6 in such a condition that the head portion thereof rests at a position which is higher than the bottom end of the stopper plate 18 and, consequently, the head portion of the fresh bobbin 7a urges the stopper plate 18 toward a direction represented by an arrow C in FIG. 8. Since the stopper plate 18 is capable of turning about the pin 19 in resilient condition, the stopper plate 18 is turned to a position where the head of the fresh bobbin 7a is capable of passing below the stopper plate 18, due to the displacement of the peg 6. Therefore, damage to the fresh bobbin 7a, peg 6 and the conveyer belt 2 can be completely prevented.

[A modification of the fresh bobbin transferring device according to the present invention is shown in FIG. 10, wherein elements similar to the elements of the first embodiment shown in FIG. 3 are represented by identical reference numerals to those of the first embodiment. In this modified embodiment, the bottom guide plate 14d is provided with a forward end portion 14k, which extends forward in a horizontal condition and a cut-out portion similar to the cut-out portion 14i of the first embodiment.

In addition, the casing 14 is disposed at a position facing a terminal of the conveyer belt 2 in such a condition that the head of each second peg 6 is capable of inserting itself into the bottom bore of the fresh bobbin 7a positioned on the forward end portion 14k when the second peg 6 approaches the forward end portion 14k when moving from a curved passage of the second peg 6 to a horizontal passage of the second peg 6. When the second peg 6 is engaged into the bottom bore of the fresh bobbin 7a, the fresh bobbin 7a is urged past the bottom stopper 16 so that the fresh bobbin 7a is discharged from the casing 14, due to the displacement of the peg 6 toward a direction A in FIG. 10. Therefore, the function of the regulating device of this embodiment is quite similar to that of the first embodiment.]

What is claimed is:

[1. In a textile machine, a method for transferring fresh bobbins from a bobbin supply device to supporting pegs mounted on a conveyer belt, comprising positioning each fresh bobbin on a supporting plane formed adjacently above said conveyer belt, resiliently preventing free escape of said fresh bobbin from said supporting plane, moving each of said pegs to a bottom bore of said fresh bobbin positioned on said supporting plane, inserting one of said pegs into said bottom bore of said fresh bobbin positioned on said supporting plane, urging said fresh bobbin toward the outside of said supporting plane by displacement of said peg, discharging said fresh bobbin from said supporting plane while overcoming said resilient prevention of free escape of said fresh bobbin.]

[2. In a textile machine provided with a doffing and donning apparatus utilizing a conveyer belt for temporarily supporting full size yarn packages doffed from said textile machine and fresh bobbins thereon, and a fresh bobbin supply device disposed at an outend frame thereof, said conveyer belt provided with a plurality of first pegs for supporting said full size yarn packages doffed from said textile machine and a plurality of second pegs for supporting said fresh bobbins supplied from said fresh bobbin supply device, said fresh bobbin supply device provided with a chute for discharging said fresh bobbins toward said second pegs one by one; a fresh bobbin transferring device disposed at an intervening position between said chute of said fresh bobbin supply device and an end portion of said conveyer belt, said transferring device comprises a first means for temporarily reserving a plurality of fresh bobbins in substantially upright condition and supplying said fresh bobbins onto said second pegs one by one when said conveyer belt is driven before carrying out the donning operation, a second means for regulating motion of mounting said fresh bobbins onto said second pegs, said first means comprising a casing provided with an inlet aperture facing said chute of said bobbin supply device and a discharging outlet for permitting free passage of said fresh bobbins therefrom and a bottom guide plate inclined downward from a side of said inlet aperture to a side of said discharging outlet; said bottom guide plate provided with a forwardly extended portion for standing a fresh bobbin thereon, said forwardly extended portion provided with a cut-out portion which permits free passage of said second pegs when said second pegs approach along a passage thereof inclined to said forwardly extended portion, said regulating means disposed on said casing at a position adjacent to said forwardly extended portion.]

[3. A fresh bobbin transferring device according to claim 2, wherein said regulating means comprises a bottom stopper disposed on said casing at a position adjacently above said forwardly extended portion of said bottom guide plate and a resilient stopper plate turnably mounted to said casing at a top portion of said discharging outlet, said bottom stopper comprises a resilient member which prevents free passage of a bottom portion of each fresh bobbin from said discharging outlet, whereby, when a bottom bore of said fresh bobbin positioned on said forwardly extended portion of said bottom guide plate is engaged with said second peg due to the driving motion of said conveyer belt and the engagement of said second peg into said bottom bore of said fresh bobbin is incorrect, the top portion of said fresh bobbin contacts said resilient stopper plate and displaces said stopper plate so that said fresh bobbin is capable of passing below said stopper plate.]

[4. A fresh bobbin transferring device according to claim 3, wherein said resilient stopper plate comprises a supporting pin secured to said casing and a stopper plate turnably mounted on said supporting pin and a helical spring mounted on said supporting pin and a stop pin mounted on said casing at a position below said supporting pin, whereby said helical spring provides resilient force to turn said stopper plate toward said stop pin and said stop pin restricts further turning motion of said stopper plate thereover.]

[*5. A fresh bobbin transferring device according to claim 3, wherein said bottom stopper comprises a bracket secured to said casing at a position adjacent to said forwardly extended portion of said bottom guide plate, said bracket is provided with an aperture, a ball is incased in said aperture, said aperture is provided with an inside circular opening which is capable of preventing free passage of said ball therethrough, an expansion spring is disposed in said aperture in such a condition that a part of said ball is always resiliently projected from said inside circular opening.*]

*6. In a textile machine, a method for transferring fresh bobbins from a bobbin supply device to supporting pegs mounted on a conveyor belt, comprising positioning a plurality of substantially parallel fresh bobbins on an incline supporting plane and an additional fresh bobbin on a horizontal supporting plane connected to said inclined supporting plane and formed adjacently above said conveyor belt, resiliently preventing free escape of said fresh bobbin on said horizontal supporting plane from said horizontal supporting plane, moving each of said pegs to a bottom bore of said fresh bobbin along a horizontal passage to said supporting plane, inserting one of said pegs into said bottom bore of said fresh bobbin positioned on said horizontal supporting plane, urging said fresh bobbin toward the outside of said supporting plane by horizontal displacement of said peg, discharging said fresh bobbin from said supporting plane while overcoming said resilient prevention of free escape of said fresh bobbin, and thereafter moving a new fresh bobbin by gravity down said incline supporting plane to said horizontal supporting plane.*

*7. A method as recited in claim 6, wherein the step of resiliently preventing free escape of said fresh bobbin from said supporting plane comprises resiliently biasing said fresh bobbin at a point above the center thereof.*

*8. In a textile machine provided with a doffing and donning apparatus utilizing a conveyor belt for temporarily supporting full size yarn packages doffed from said textile machine and fresh bobbins thereon, and a fresh bobbin supply device disposed on an outend frame thereof, said conveyor belt provided with a plurality of first pegs for supporting said full size yarn packages doffed from said textile machine and a plurality of second pegs for supporting said fresh bobbins supplied from said fresh bobbins supply device, said fresh bobbin supply device, provided with a chute for discharging said fresh bobbins toward said second pegs one by one; a fresh bobbin transferring device disposed at an intervening position between said chute of said fresh bobbin supply device and an end portion of said conveyer belt, said transferring device comprises a first means for temporarily reserving a plurality of fresh bobbins in substantially upright condition and supplying said fresh bobbins onto said second pegs one by one when said conveyer belt is driven before carrying out the donning operation, a second means for regulating motion of mounting said fresh bobbins onto said second pegs, said first means comprising a casing provided with an inlet aperture facing said chute of said bobbin supply device and a discharging*

*outlet for permitting free passage of said fresh bobbins therefrom and a bottom guide plate inclined downward from a side of said inlet aperture to a side of said discharging outlet, said bottom guide plate provided with a horizontally extending portion for receiving one bobbin at a time from said inclined portion and for standing a fresh bobbin thereon, said horizontally extending portion provided with a cut-out portion for permitting free passage of said second pegs when said second pegs approach along a horizontal passage thereof, said regulating means disposed on said casing at a position adjacent to said horizontally extending portion.*

*9. A fresh bobbin transferring device according to claim 8, wherein said regulating means comprises a resilient stopper plate turnably mounted on said casing at a top portion of said discharging outlet for biassing said fresh bobbins at a point above the center thereof.*

*10. A fresh bobbin transferring device according to claim 9, wherein said resilient stopper plate comprises a supporting pin secured to said casing and a stop pin mounted on said casing at a position below said supporting pin, whereby said helical spring provides resilient force to turn said stopper plate towards said stop pin and said stop pin restricts further turning motion of said stopper plate.*

*11. A fresh bobbin transferring device according to claim 9, further comprising a bracket secured to said casing at a position adjacent said horizontally extending portion of said bottom guide plate, said bracket being provided with an aperture, a ball encased in said aperture, said aperture being provided with an inside circular opening having a diameter more than the diameter of said ball, an expansion spring disposed in said aperture and biasing said ball to project from within said circular opening.*

* * * * *